United States Patent
Feng et al.

(10) Patent No.: US 11,106,431 B2
(45) Date of Patent: Aug. 31, 2021

(54) APPARATUS AND METHOD OF FAST FLOATING-POINT ADDER TREE FOR NEURAL NETWORKS

(71) Applicant: DINOPLUSAI HOLDINGS LIMITED, Fremont, CA (US)

(72) Inventors: Yutian Feng, San Jose, CA (US); Yujie Hu, Fremont, CA (US)

(73) Assignee: DINOPLUSAI HOLDINGS LIMITED, Fremont, CA (US)

( * ) Notice: Subject to any disclaimer, the term of this patent is extended or adjusted under 35 U.S.C. 154(b) by 27 days.

(21) Appl. No.: 16/798,300

(22) Filed: Feb. 22, 2020

(65) Prior Publication Data

US 2020/0272417 A1    Aug. 27, 2020

Related U.S. Application Data

(60) Provisional application No. 62/809,633, filed on Feb. 24, 2019.

(51) Int. Cl.
*G06F 7/53* (2006.01)
*G06F 7/485* (2006.01)
*G06F 7/50* (2006.01)
*G06F 7/501* (2006.01)

(52) U.S. Cl.
CPC ............ *G06F 7/5312* (2013.01); *G06F 7/485* (2013.01); *G06F 7/50* (2013.01); *G06F 7/501* (2013.01); *G06F 7/5318* (2013.01)

(58) Field of Classification Search
CPC .... G06F 7/485; G06F 7/50–501; G06F 7/505; G06F 7/5312
See application file for complete search history.

(56) References Cited

U.S. PATENT DOCUMENTS

| | | | | |
|---|---|---|---|---|
| 6,848,043 | B1 * | 1/2005 | Yeh | G06F 9/3824 712/216 |
| 2002/0129077 | A1 * | 9/2002 | Rhee | G06F 7/607 708/708 |
| 2004/0049528 | A1 * | 3/2004 | Jalfon | G06F 7/509 708/552 |

OTHER PUBLICATIONS

A. Momeni, J. Han, P. Montuschi and F. Lombardi, "Design and Analysis of Approximate Compressors for Multiplication," in IEEE Transactions on Computers, vol. 64, No. 4, pp. 984-994, Apr. 2015 (Year: 2015).*

* cited by examiner

*Primary Examiner* — Matthew D Sandifer
(74) *Attorney, Agent, or Firm* — Blairtech Solution LLC

(57) ABSTRACT

A computing device to implement fast floating-point adder tree for the neural network applications is disclosed. The fast float-point adder tree comprises a data preparation module, a fast fixed-point Carry-Save Adder (CSA) tree, and a normalization module. The floating-point input data comprises a sign bit, exponent part and fraction part. The data preparation module aligns the fraction part of the input data and prepares the input data for subsequent processing. The fast adder uses a signed fixed-point CSA tree to quickly add a large number of fixed-point data into 2 output values and then uses a normal adder to add the 2 output values into one output value. The fast adder uses for a large number of operands is based on multiple levels of fast adders for a small number of operands. The output from the signed fixed-point Carry-Save Adder tree is converted to a selected floating-point format.

4 Claims, 8 Drawing Sheets

US 11,106,431 B2

APPARATUS AND METHOD OF FAST FLOATING-POINT ADDER TREE FOR NEURAL NETWORKS

CROSS REFERENCE TO RELATED APPLICATIONS

The present invention claims priority to U.S. Provisional Patent Application, Ser. No. 62/809,633, filed Feb. 24, 2019. The U.S. Provisional Patent Application is hereby incorporated by reference in its entirety.

FIELD OF THE INVENTION

The present invention relates to a computing device to support operations required in neural networks. In particular, the present invention relates to hardware architecture for floating-point adder tree that achieves substantial speed improvement over the conventional hardware structure for adding up weighted sums.

BACKGROUND

Today, artificial intelligence has been used in various applications such as perceptive recognition (visual or speech), expert systems, natural language processing, intelligent robots, digital assistants, etc. Artificial intelligence is expected to have various capabilities including creativity, problem solving, recognition, classification, learning, induction, deduction, language processing, planning, and knowledge. Neural network is a computational model that is inspired by the way biological neural networks in the human brain process information. Neural network has become a powerful tool for machine learning, in particular deep learning, in recent years. In light of power of neural networks, various dedicated hardware and software for implementing neural networks have been developed.

FIG. 1A illustrates an example of a simple neural network model with three layers, named as input layer 110, hidden layer 120 and output layer 130, of interconnected neurons. The output of each neuron is a function of the weighted sum of its inputs. A vector of values $(X_1 \ldots X_M)$ is applied as input to each neuron in the input layer. Each input in the input layer may contribute a value to each of the neurons in the hidden layer with a weighting factor or weight $(W_{ij})$. The resulting weighted values are summed together to form a weighted sum, which is used as an input to a transferor activation function, $f(\cdot)$ for a corresponding neuron in the hidden layer. Accordingly, the weighted sum, $Y_j$ for each neuron in the hidden lay can be represented as:

$$Y_j = \Sigma_{i=1}^{3} W_{ij} X_i, \quad (1)$$

where $W_{ij}$ is the weight associated with $X_i$ and $Y_j$. The output, $y_i$ at the hidden layer becomes:

$$y_j = f(\Sigma_{i=1}^{3} W_{ij} X_i + b), \quad (2)$$

where b is the bias.

The output values can be calculated similarly by using $y_j$ as input. Again, there is a weight associated with each contribution from $y_j$. FIG. 1B illustrates an example of a simple neural network model with four layers, named as input layer 140, layer 1 (150), layer 2 (160) and output layer 170, of interconnected neurons. The weighted sums for layer 1, layer 2 and output layer can be computed similarly.

As shown above, in each layer, the weighted sum has to be computed for each node. The vector size of the input layer, hidden layer and output layer could be very large (e.g. 256). Therefore, the computations involved may become very extensive. The weighted sum, $Y_j$ for for the case with M input $(X_1 \ldots X_M)$ and N neurons in a hidden layer can be computed according to:

$$Y_j = \Sigma_{i=1}^{M} W_{ij} X_i, \text{for } j=1, \ldots, N. \quad (3)$$

For neural network application, the input $X_i$ and weight $W_{ij}$ are often represented in a floating-point format. For example, the IEEE-754 single precision (fp32) or double precision format (fp64) is being used in some neural network applications. Also, half precision format (fp16) can be used. Therefore, there are needs for adding up a large number of floating-point numbers in neural network applications. FIG. 2 illustrates the fp16 (210), fp32 (220) and fp64 (230) formats according to the IEEE-754 standard. According to IEEE-754 floating-point format, the leading bit is a sign bit followed by an exponent part and fraction part. For the fp16 format, there are 5 bits in the exponent part and 10 bits in the fraction part. For the fp32 format, there are 8 bits in the exponent part and 23 bits in the fraction part. For the fp64 format, there are 11 bits in the exponent part and 52 bits in the fraction part. The value represented by the IEEE-754 floating-point format is:

$$x = (-1)^s \times (1+\text{fraction}) \times 2^{(\text{exponent-bias})}. \quad (4)$$

In the above equation, "S" corresponds to the value of the sign bit, "fraction" corresponds to the value of the fraction part and "exponent" corresponds to the value of the exponent part. The value of the exponent part corresponds to the unsigned binary number represented by the exponent part. On the other hand, the value of the fraction part $(b_1, b_2, \ldots, b_m)$ is calculated as $=b_1 2^{-1} + b_2 2^{-2} + \ldots + b_m 2^{-m}$. The bias for fp16, fp32 and fp64 are 15, 127 and 1023 respectively.

As mentioned above, the conventional PEs will take a long time to generate the weighted sums when the number of inputs is large. It is desirable to develop a computing device that can reduce the time required to compute the weighted sums.

BRIEF SUMMARY OF THE INVENTION

A 4-to-2 fixed-point Carry-Save Adder (CSA) to generate a sum output and a carry-over output for four input operands is disclosed, where each input operand is represented as a signed n-bit data, the sum output and the carry-over output are (n+2)-bit data, and n is a positive integer. The 4-to-2 fixed-point Carry-Save Adder comprises a first 3-to-2 adder array, and a second 3-to-2 adder array coupled to the first 3-to-2 adder array. The first 3-to-2 adder array comprises (n+1) 1-bit 3-to-2 adders configured to receive and apply bit-wise addition to three first adder-array inputs to generates a first adder-array sum output and a first adder-array carry-over output. The second 3-to-2 adder array comprises (n+2) 1-bit 3-to-2 adders configured to receive and apply the bit-wise addition to three second adder-array inputs to generates a second adder-array sum output and a second adder-array carry-over output. The three first adder-array inputs are coupled to three of the four input operands and the three second adder-array inputs are coupled to the first adder-array sum output, the first adder-array carry-over output, and a remaining one of the four input operands. The second adder-array sum output and the second adder-array carry-over output are coupled to the sum output and the carry-over output.

The 4-to-2 fixed-point Carry-Save Adder may further comprises a first input formatter configured to extend sign bits of said three of the four input operands to generate three sign-extended input operands respectively and to provide the three sign-extended input operands as the three first adder-array inputs to the first 3-to-2 adder array. In one embodiment, the 4-to-2 fixed-point Carry-Save Adder may further comprise a second input formatter configured to extend the sign bit of the first adder-array sum output to generate a sign-extended first adder-array sum output, to left-shift by 1-bit and then to extend the sign bit of the first adder-array carry-over output to generate a sign-extended first adder-array carry-over output, to extend the sign bit of the remaining one of the four input operands twice to generate a sign-extended remaining input operand, and to provide the sign-extended first adder-array sum output, the sign-extended first adder-array carry-over output and the sign-extended remaining input operand as the three second adder-array inputs to the second 3-to-2 adder array. In yet another embodiment, the 4-to-2 fixed-point Carry-Save Adder may further comprise an output formatter configured to provide the second adder-array sum output as the sum output, and to left-shift by 1-bit the second adder-array carry-over output to generate a shifted adder-array carry-over output and to provide the shifted adder-array carry-over output as the carry-over output.

A fixed-point adder tree to sum vector inputs is also disclosed. The fixed-point adder tree comprises a plurality of adder-array levels configured in a tree structure. Each of said plurality of adder-array levels is arranged to sum previous-level outputs comprising previous-level sum outputs and carry-over outputs, except for a first level of said plurality of adder-array levels, and to generate current-level outputs comprising current-level sum outputs and current-level carry-over outputs. The first level of said plurality of adder-array levels is configured to sum the vector inputs and to generate the current-level outputs comprising the current-level sum outputs and the current-level carry-over outputs for the first level of said plurality of adder-array levels. The number of adder-arrays at a current-level of said plurality of adder-array levels is reduced by half from the number of adder-arrays at a previous-level of said plurality of adder-array levels. Each of said plurality of adder-array levels except for a last level of said plurality of adder-array levels comprises a plurality of adder-arrays, wherein each of said plurality of adder-arrays corresponds to a 4-to-2 fixed-point Carry-Save Adder (CSA) to generate a CSA sum output and a CSA carry-over output for four CSA input operands, wherein each of said four CSA input operand is represented as a signed n-bit data, the CSA sum output and the CSA carry-over output are (n+2)-bit data, and n is a positive integer.

In yet another embodiment, a floating-point adder tree to sum vector inputs is disclosed, wherein each of the vector inputs comprises a sign part, an exponent part and a fractional part. The floating-point adder tree comprises a maximum detection circuit, a data formatter circuit, and a signed adder-array tree. The maximum detection circuit is coupled to the vector inputs to determine a maximum exponent among the exponent parts of the vector inputs. The data formatter circuit is coupled to the vector inputs to convert the fractional parts of the vector inputs to 2's-complement fractions and to right-shift the 2's-complement fractions according to difference between the maximum exponent and the exponent parts respectively to generate shifted 2's-complement fractions. The signed adder-array tree is coupled to add the shifted 2's-complement fractions to generate a sum part and a carry-over part of the shifted 2's-complement fractions. The signed adder-array tree comprises a plurality of adder-array levels configured in a tree structure. Each of said plurality of adder-array levels is arranged to sum previous-level outputs comprising previous-level sum outputs and carry-over outputs, except for a first level of said plurality of adder-array levels, and to generate current-level outputs comprising current-level sum outputs and current-over outputs. The first level of said plurality of adder-array levels is configured to sum the vector inputs and to generate the current-level outputs comprising the current-level sum outputs and the current-level carry-over outputs for the first level of said plurality of adder-array levels. The number of adder-arrays at a current-level of said plurality of adder-array levels is reduced by half from the number of adder-arrays at a previous-level of said plurality of adder-array levels. Each of said plurality of adder-array levels except for a last level of said plurality of adder-array levels comprises a plurality of adder-arrays, wherein each of said plurality of adder-arrays corresponds to a 4-to-2 fixed-point Carry-Save Adder (CSA) to generate a CSA sum output and a CSA carry-over output for four CSA input operands, wherein each of said four CSA input operand is represented as a signed n-bit data, the CSA sum output and the CSA carry-over output are (n+2)-bit data, and n is a positive integer.

In one embodiment, the floating-point adder tree further comprises a combiner circuit coupled to combine the sum part and the carry-over part of the shifted 2's-complement fractions to generate a final sum of the shifted 2's-complement fractions. In another embodiment, the floating-point adder tree further comprises a normalization circuit coupled to convert the final sum of the shifted 2's-complement fractions based on the maximum exponent to a target final sum comprising a target sign part, a target exponent part and a target fraction part.

DETAILED DESCRIPTION OF THE INVENTION

Figure 1A:
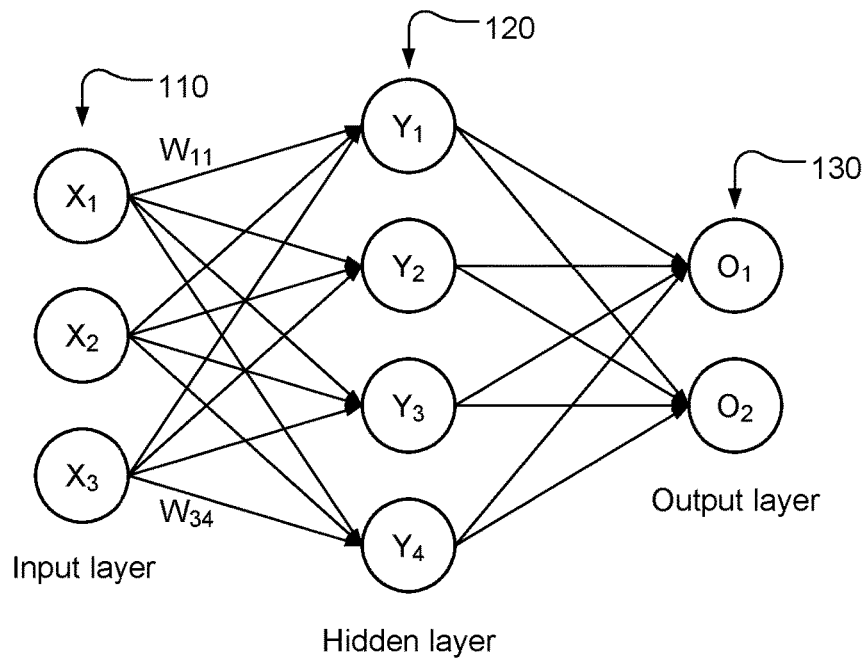
FIG. 1A illustrates an example of neural network with an input layer, a hidden layer and an output layer.
Figure 1B:
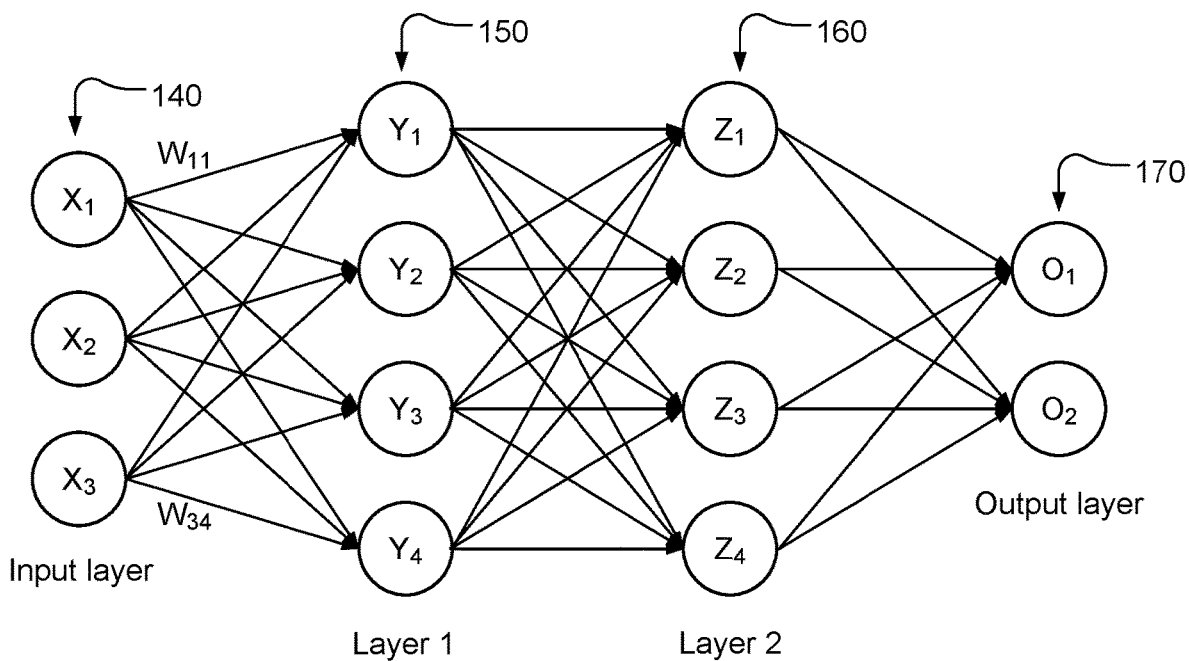
FIG. 1B illustrates an example of neural network with an input layer, two internal layers and an output layer.
Figure 2:
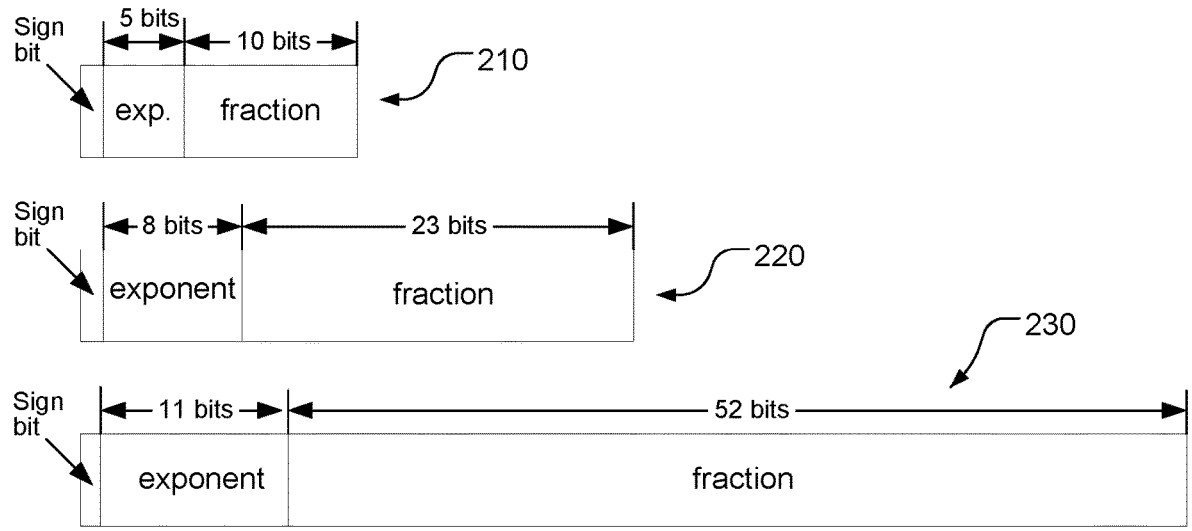
FIG. 2 illustrates the fp16, fp32 and fp64 formats according to the IEEE-754 standard.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

In neural network applications, the multiplication-accumulation is a basic element as required by most of the neural network algorithms. In some large scale neural networks, there may be billions of parameters that need the multiplication-accumulation operations. Such computational intensive operations are expensive and become a bottleneck in processors based implementation. Therefore, dedicated hardware solutions are often required to implement large neural network systems.

As is known in the field, hardware implementation for the integer multiplication-accumulation is straightforward. However, for the floating-point multiplication-accumulation, it becomes a challenging issue to design low cost and/or high performance hardware with sufficient precision.

As mentioned above, the weighted sum calculation plays an important role in neural networks and deep learning. Accordingly, the present invention discloses a high-speed floating-point adder tree capable of handling a large number of operands (e.g. 128, 256 or 512) for the neural network applications. For example, an embodiment according to the present invention can add up 128 operands in the fp32 format into two results in about one clock cycle, where each fp32 operand corresponds to the multiplication result of an input signal and a weight in the fp16 format.

Figure 3:
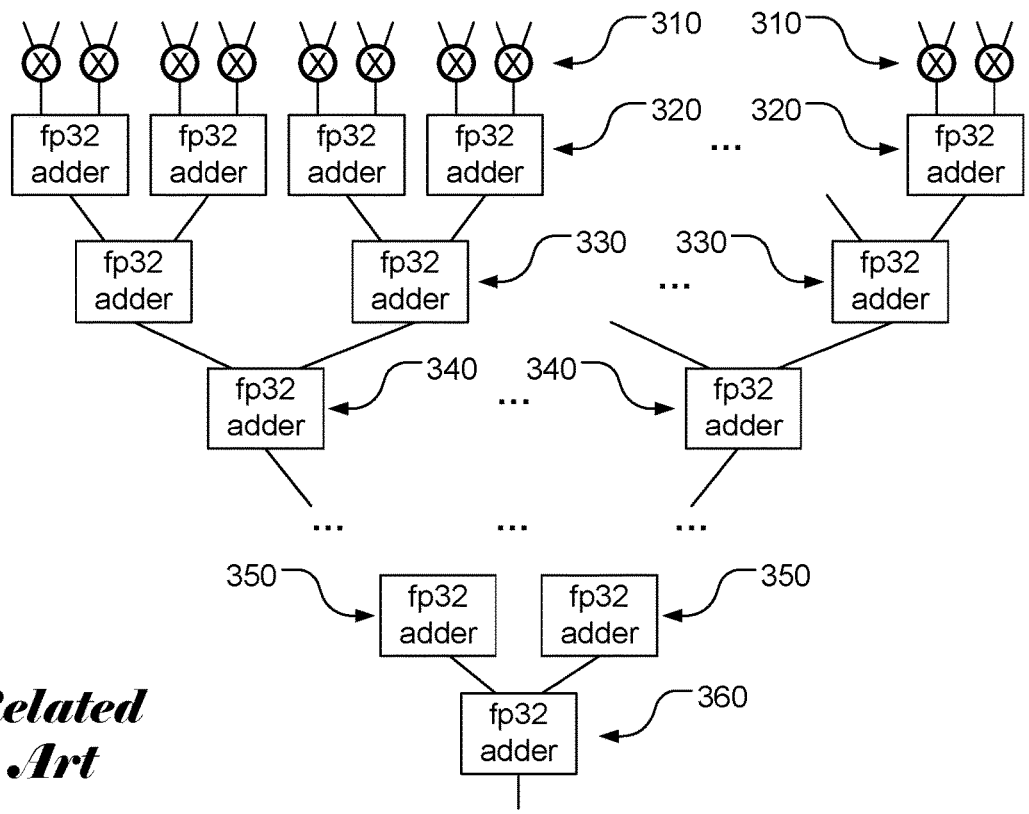
FIG. 3 illustrates an example of traditional multiplication-addition solution.

FIG. 3 illustrates an example of traditional multiplication-addition solution. An array of inputs is multiplied with corresponding weights using multiple multipliers (310). Each operand of the multiplier (310) corresponds to an fp16 number. The output is represented in the fp32 format. An adder tree based on 2-to-1 adders is used to add up the multiplication results. The adder tree comprises multiple layers. If there are N1 multiplication results, N1/2 adders (320) are used in the first layer; N1/4 adders (330) are used in the second layer; and N1/8 adders (340) are used in the third layer as shown in FIG. 3. There are two adders (350) in the second last layer and one adder (360) in the last layer. It is known that the implementation of fp32 adder involves high cost due to the circuits required for mantissa adjustment and normalization. Each fp32 adder may need around 3 pipelines to finish. The pipeline delay needs many registers (e.g. flip-flops) to buffer the intermediate values, which results in larger circuit size and higher power consumption. In order to overcome the high cost and high power consumption associated with the conventional floating-point adder tree, the present invention introduces a floating-point adder tree solution that requires much smaller circuits and runs much faster. Furthermore, the adder tree according to the present invention also consumes much less power.

According to IEEE-754 fp16 standard, there are 1 sign bit, 5 bits of exponent and 10 bits of mantissa. The IEEE-754 fp16 standard implies one integer bit. Therefore, the fp16 significand is 11 bits effectively. After two fp16 data multiplication, the product result requires 1 sign bit, 6 bits of exponent and 22 bits of significand to represent the value.

The data range defined by the IEEE-754 fp16 specification also includes the explicitly defined infinity and nan (not a value) values for convenience. The value represented by the IEEE-754 as shown in equation (4) implies that the actual significand (i.e., (1+fraction)) has an implicit leading bit with a value of 1.

Figure 4A:
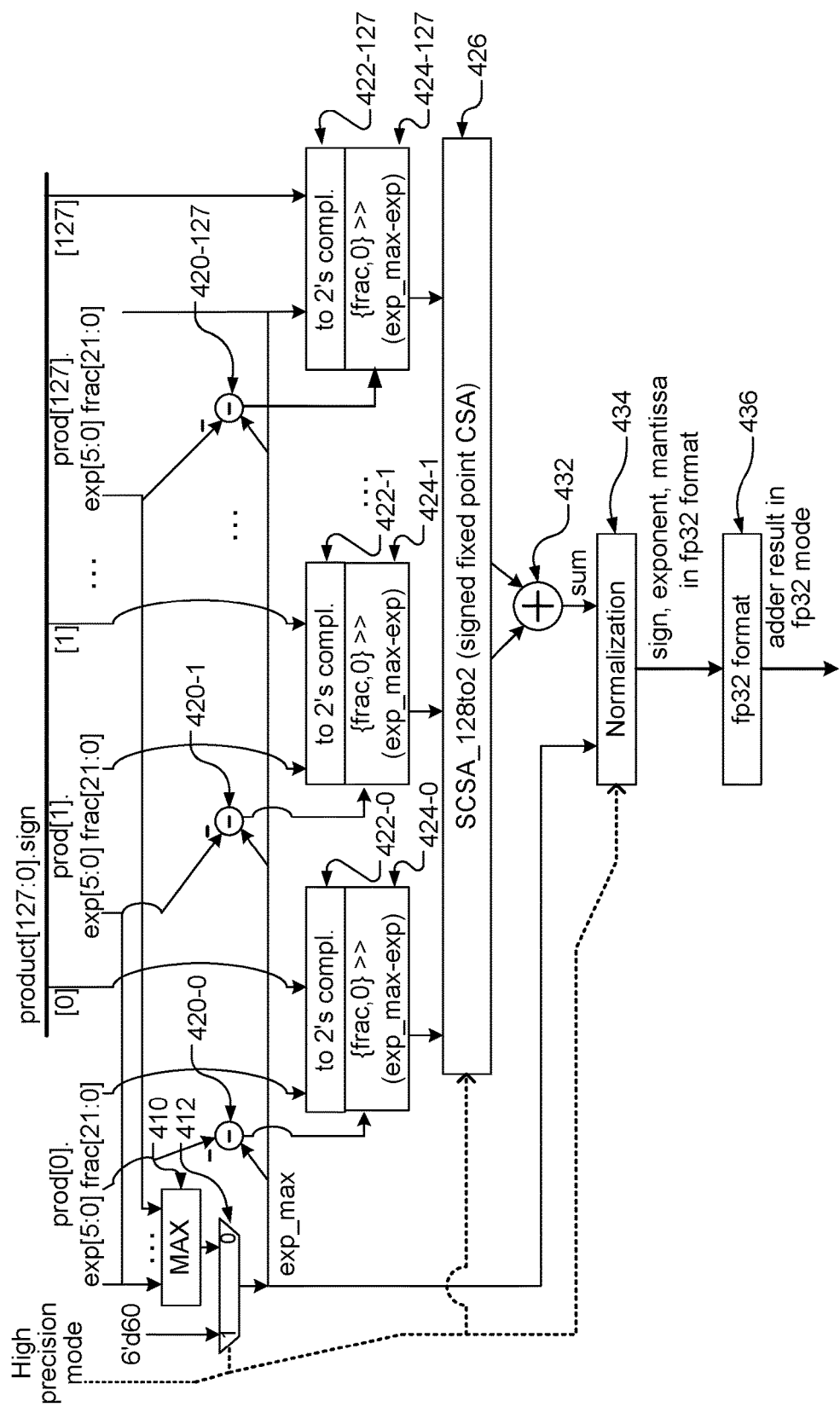
FIG. 4A illustrates an example of adder tree according to the present invention, where the operands comprise N multiplication products and each operand is in an fpXX format (e.g. XX=16, 32 or 64).

The present invention discloses high-speed floating-point adder for neural network applications. The high-speed floating-point adder according to the present invention utilizes adder tree structure to build high-speed floating-point adder for a large number of operands based on high-speed floating-point adders for a small number of operands. An example of adder tree according to the present invention is illustrated in FIG. 4A, where the operands comprise N multiplication products and each operand is in an fpXX format (e.g. XX=16, 32 or 64). In FIG. 4A, N corresponds to 128 and each operand corresponds to the product result of an fp16 input and an fp16 weight. The N (N=128) operands corresponding to N product results are designated as prod [127:0]. Each product (i.e., prod[i]) comprises different fields representing the sign, exponent, and fraction of the product (e.g., prod[i].sign, prod[i].exp and prod[i].frac). In addition, each product may also use fields to explicitly indicating the whether the product is infinity or nan (e.g., prod[i].infinity or prod[i].nan). In the example for fp16 input signals and fp16 weights, the product result requires 1 sign bit, 6 bits of exponent and 22 bits of significand to represent the value. In other words, the exponent field is represented in 6 bits (e.g. prod[i].exp[5:0]) and the fraction field is represented in 22 bits (e.g. prod[i].frac[21:0]).

The particular floating-point data format mentioned here is used as an example and should not be construed as a limitation to the present invention. In general, any floating-point data form comprising a sign part, an exponent part and significant part can be used. Furthermore, the bit depth for various fields can be extended if needed.

According to embodiments of the present invention, the fast floating-point adder comprises 4 major steps:
  a. Data preparation: determine the maximum of N (e.g., N=128) product exponents; convert product fractions to the 2's complement format; and align the product fraction by right shifting the product fraction in order to maintain the same value represented by the floating-point format while setting the product exponent equal to the maximum exponent.

b. Fast adder: use signed fixed-point Carry-Save Adder to quickly add the 128 products into 2 output values. Then use a normal adder to add the 2 output values into one output value, named as the sum. The value of the summation result can be calculated according to: sum*2^(maximum exponent).

c. Normalization: Since the operands to the 128-to-2 fast adder tree are converted to a format with maximum exponent and aligned fraction so that the adder tree can quickly calculate the sum, the summation result needs to be converted back the fp32 format. The format conversion comprises the following operations: converting 2's complement data to a sign bit and a mantissa part; left shifting the mantissa till the MSB is 1; decreasing the exponent by 1 for every left-shift operation. After the operations is step c, the data corresponds to the product format for the product of two fp16 data. Finally, the sum in the product format is converted to the fp32 format.

d. Optional infinity and nan process: if explicit infinity and nan fields are supported, the summation infinity or nan status is calculated as follows according to fp32 summation definition. If infinity or nan is detected at the output, the output value is set as fp32 specification. Otherwise it outputs the normalization result.

Output positive infinity if only positive infinity and normal data in 128 products.

Output negative infinity if only negative infinity and normal data in 128 products.

Output nan if any data is nan in 128 products or positive infinity and negative infinity and normal data in 128 products.

According to an embodiment of the present invention, the operands are in a floating-point format comprising a sign bit, an exponent part and a fraction part. The operands are first aligned to cause the aligned operands to have the same modified exponent part. For operand alignment, the maximum exponent of the operand exponent is first determined. The exponent parts from all operands are provided to a maximum module (MAX 410) to determine the maximum exponent of the exponent parts from all operands as shown in FIG. 4A. In some applications, the maximum exponent may be pre-determined. For example, a predetermined maximum exponent EXP_MAX (e.g., a decimal value of 60, "6'd60" in FIG. 4A) can be provided to a selector 412 for the system to use the predetermined maximum exponent EXP_MAX or the derived maximum exponent (exp_max). The use of the predetermined EXP_MAX is optional. A system according to the present invention may be implemented without this option (i.e., without the EXP_MAX input and the selector 412). The number of bits to be right-shifted for alignment corresponds to (exp_max−exp), which is calculated using subtractors 420-1 (1=0, . . . , 127). One input of subtractor 420-$i$ is exp_max and the other input is exp, which represents the exponent value of prod [i] (i.e., prod[i].exp[5:0]). As is understood, the index for exp is dropped for convenience. Each operand is then aligned by converting the sign and the fraction part into a 2's complement format using 2's complement format conversion unit 422-$i$ and then shifting the 2's complement number right by (exp_max−exp) bits using shifter 424-$i$. The aligned fraction parts in the 2's complement format for 128 operands are provided to the 128-to-2 fast floating-point adder 426 to provide 2 outputs.

Figure 4B:
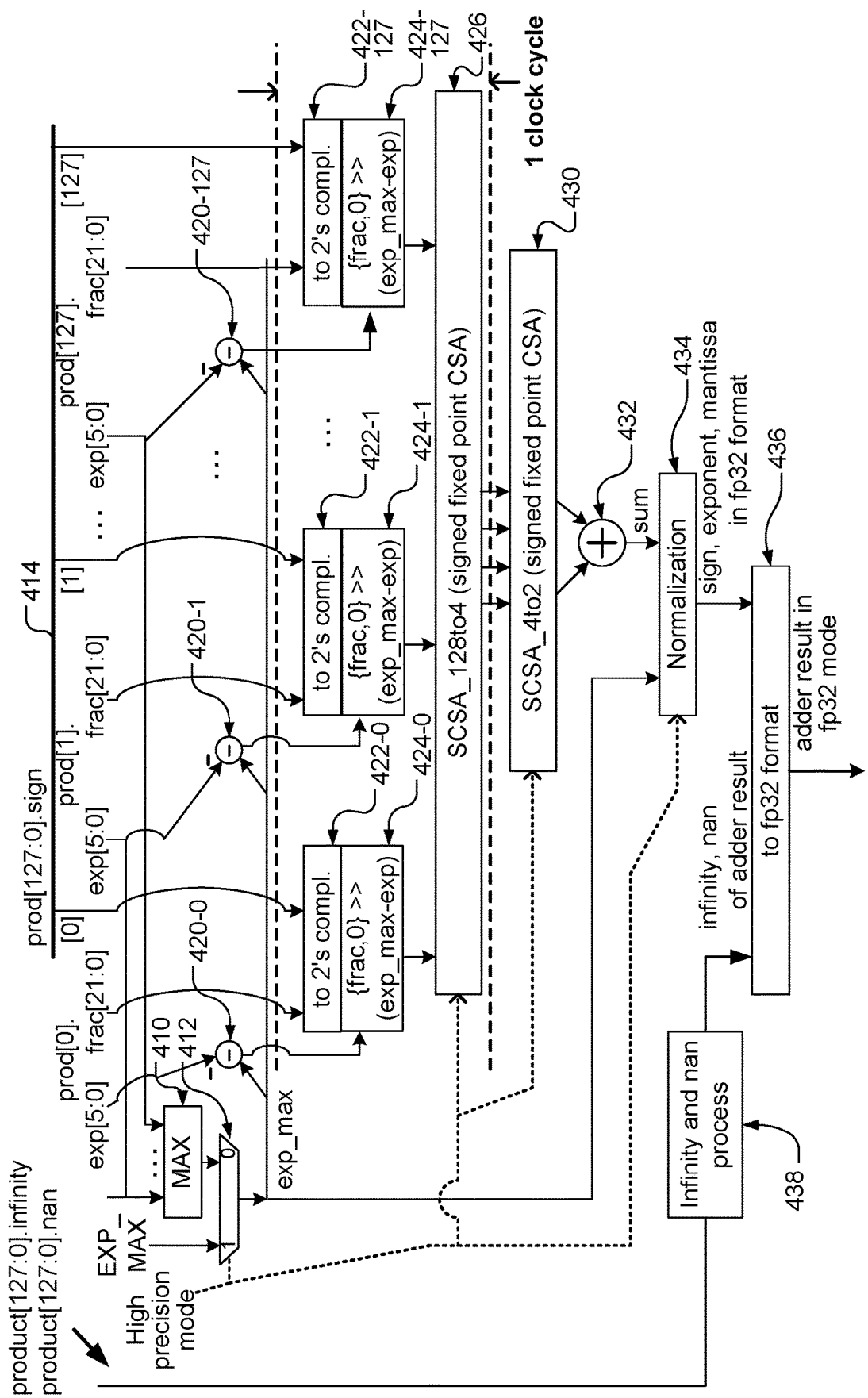
FIG. 4B illustrates an example of adder tree of FIG. 4A with the optional infinity and nan process module.

The two outputs are then added using adder 432 to produce the sum for the aligned fractions of the 128 operands. The sum for the aligned fractions of the 128 operands is then normalized using a normalization module 434 and converted back to the fp32 format according to the maximum exponent exp_max using the fp32 format converter 436 as shown in FIG. 4A. The fast adder tree may also include the infinity and nan process module 438 (shown in FIG. 4B) as described in step 4 of the fast adder tree operations.

The total number of operands in the example corresponds to 128. However, the present invention can be easily extended for other numbers of operands, such as 256, 512 or 1024.

Fixed point Carry-Save Adder (CSA) technique is well-known in the field of computing architecture and device for its high speed characteristics. The Carry-Save Adder (CSA) technique can reduce the delay substantially. The idea is to add multiple numbers together and convert it into 2 numbers corresponding to carry (C) and sum (S) of the addition result of the multiple operands. The CSA method explicitly calculates the carry and sum without the need for dealing with the carry propagation. The CSA postpones the carry propagation till the stage after the CSA.

The conventional CSA is usually intended for unsigned numbers. Also, the conventional CSA is usually designed for a smaller number of operands. The use of CSA architecture can reduce the circuit size compared to a multiple-level hierarchical 2-to-1 floating point adder tree. The latency is also much smaller.

Figure 5:
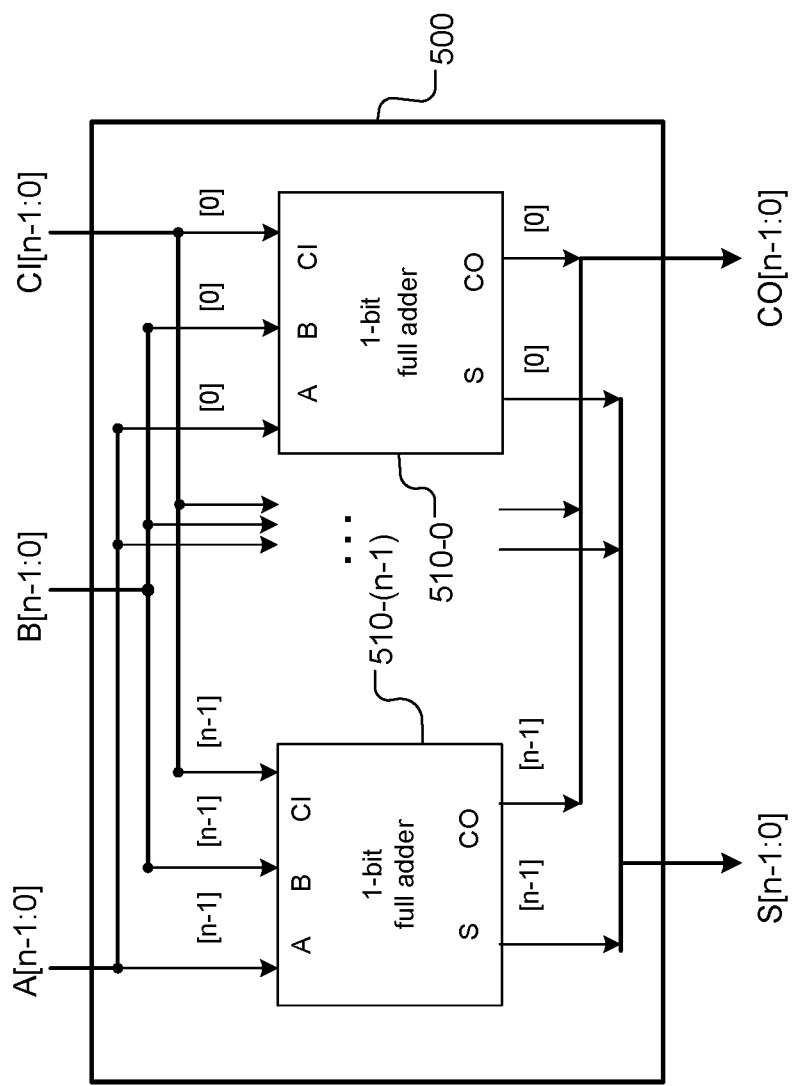
FIG. 5 illustrates an example of 3-to-2 Carry-Save Adder using n 1-bit full adders.

The signed Carry-Save Adder according to embodiments of the present invention can be built based on a regular 3-to-2 Carry-Save Adder to perform bit-wise additions. An example of 3-to-2 Carry-Save Adder 500 using n 1-bit full adders (510-0, . . . , 510—n−1)) is shown in FIG. 5, where corresponding bits of the three inputs (i.e., A(i), B(i) and CI(i)) are added. Each adder (500-$i$) has 3 inputs and 2 outputs, where the 3 inputs correspond to 3 aoperands (labelled as A[n−1;0], B[n−1;0], C[n−1;0] in FIG. 5) and the 2 outputs corresponds to carry result (CO[n−1;0]) and sum result (S[n−1;0]). Since no carry propagation is performed by the CSA, the 3-to-2 CSA as shown in FIG. 5 can quickly provide the carry and sum results.

Figure 6:
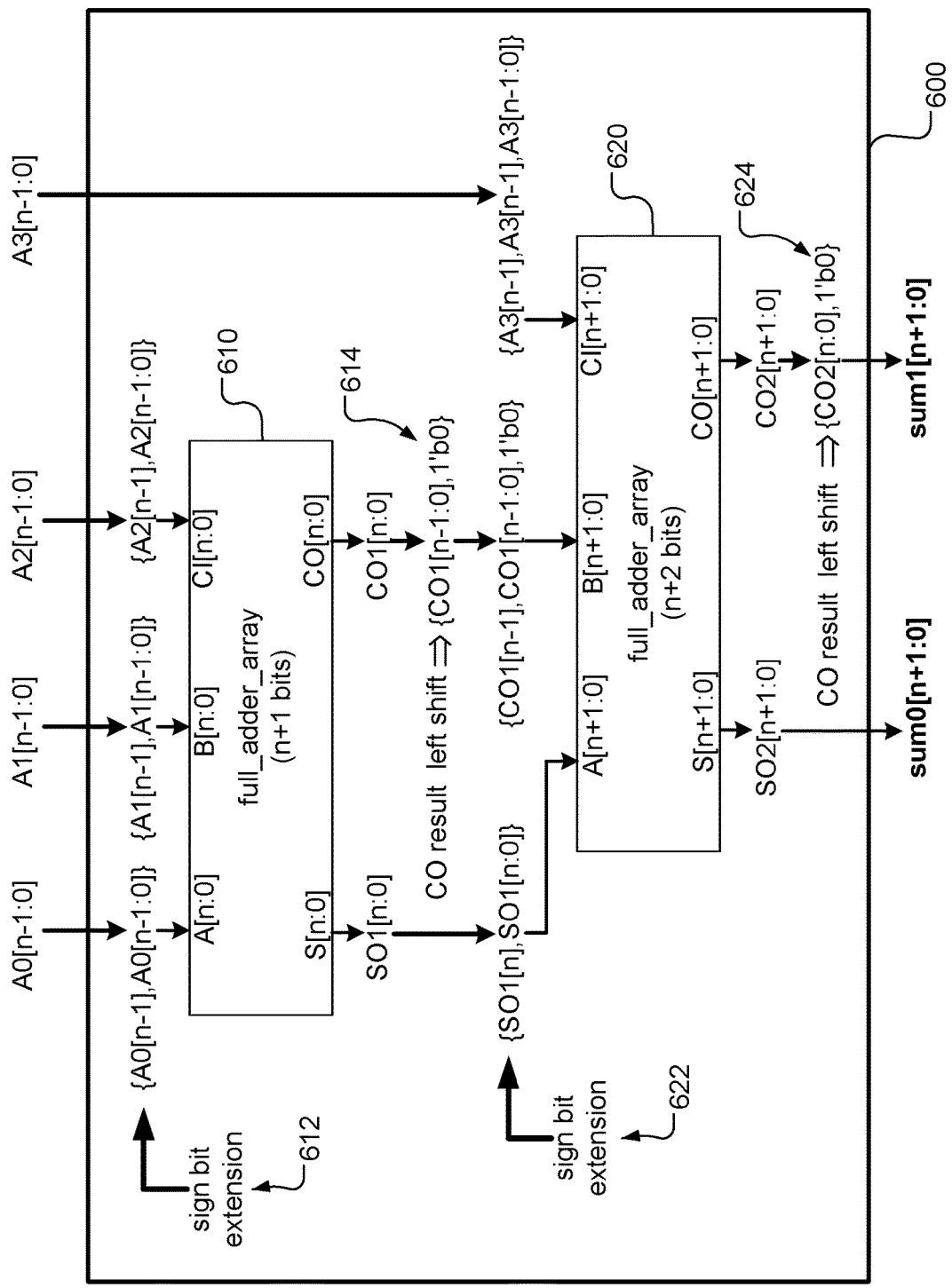
FIG. 6 illustrates an example of sign-extended 4-to-2 floating-point Carry-Save Adder according to an embodiment of the present invention as a building block for the fast adder tree, where the sign-extended 4-to-2 floating-point Carry-Save Adder is built upon 3-to-2 Carry-Save Adders.

In order to build the fast adder tree hierarchy, a sign-extended 4-to-2 floating-point Carry-Save Adder 600 is disclosed as a building block for the fast adder tree. An example of sign-extended 4-to-2 floating-point Carry-Save Adder based on 3-to-2 Carry-Save Adder is shown in FIG. 6. An (n+1) bit 3-to-2 Carry-Save Adder 610 is used to add the first 3 operands (i.e., A0[n−1;0], A1[n−1;0] and A2[n−1;0]). Before the operands are provided to the 3-to-2 Carry-Save Adder, a sign bit extension operation (612) is applied to individual operands by repeating the first bit (i.e., the sign bit). Therefore, the inputs to the 3-to-2 Carry-Save Adder become {A0[n−1], A0[n−1,0]}, {A1 [n−1], A1 [n−1,0]} and {A2[n−1], A2[n−1,0]}. The outputs from the first 3-to-2 Carry-Save Adder 610 are labelled as SO1[n;0] and CO1[n:0] for the sum result and the carry result respectively. A left-shift operation 614 is applied to the carry result CO1[n:0] to obtain shifted carry result {CO1[n−1:0],1'b0} before further operations are applied, where "1'b0" represent a 1-bit data with a binary value of "0". In other words, the left-shift operation fills the LSB (least significant bit) with a "0". After left-shift operation 614, the bit CO1[n] is dropped. It's easy to deduct CO1[n] is the redundant sign bit and always same with CO1[n−1]. So dropping CO1[n] won't affect its 2's complement value. A second 3-to-2 Carry-Save Adder 620 is used to add the first-stage two outputs SO1[n:0] and CO1[n:0] and the fourth input A3[n−1,0]. The second 3-to-2 Carry-Save Adder 620 corresponds to an (n+2)-bit adder. Again, the second-stage operands are processed by sign extension 622 before they are provided to the second 3-to-2 Carry-Save Adder 620. Accordingly, the inputs to the second 3-to-2 Carry-Save Adder 620 correspond to {SO1[n],SO1[n:0]}, {CO1[n−1],CO1[n−1:0],0} and {A3[n−1],A3[n−1], A3[n−1:0]}, where the sign bit (i.e., A3[n−1]) for the fourth operand is extended twice.

The outputs from the second 3-to-2 Carry-Save Adder 620 are labelled as 502[n+1;0] and CO2[n+1;0] for the sum result and the carry result respectively. Again, a left-shift operation 624 is applied to the carry result CO2[n+1:0] to obtain {CO2[n:0],0} before further operation. For the same reason in the last paragraph, after left-shift, CO2[n+1] is dropped. The final outputs form the fast 4-to-2 Carry-Save Adder 600 are labelled as sum0[n+1:0] and sum1[n+1:0]. Compared to the inputs (i.e., Ai[n−1:0], 1=0, . . . ,3) to the fast 4-to-2 Carry-Save Adder 600, the data accuracy of the outputs (i.e., sumi[n+1:0], 1=0,1) is expanded by 2 bits.

Figure 7:
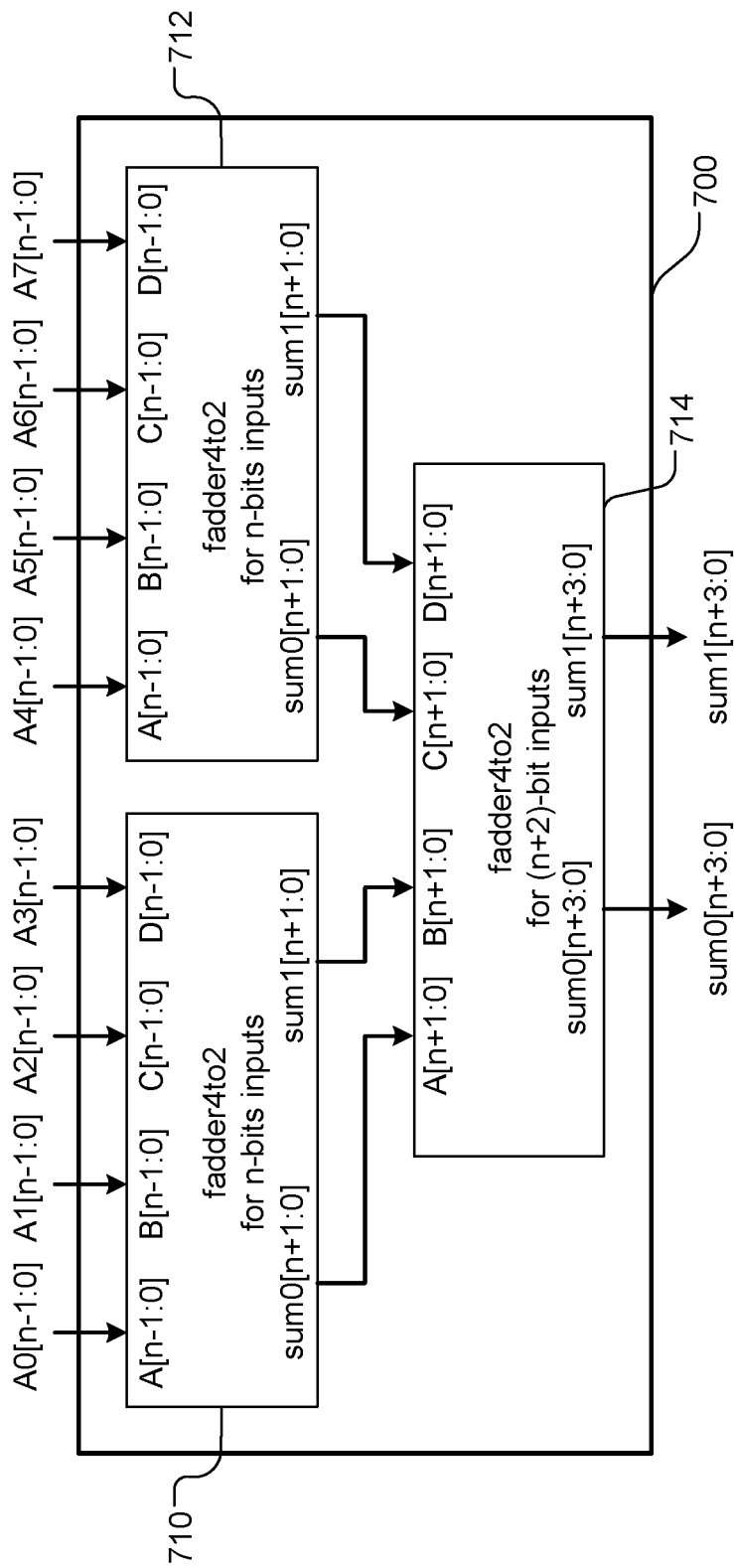
FIG. 7 illustrates an example of fast 8-to-2 Carry-Save Adder tree based on the fast 4-to-2 Carry-Save Adder.

The fast 4-to-2 Carry-Save Adder as shown in FIG. 6 can be used as a building block to form an adder tree to support a large number of operands. FIG. 7 illustrates an example of fast 8-to-2 Carry-Save Adder tree 700 based on the fast 4-to-2 Carry-Save Adder. The fast 8-to-2 Carry-Save Adder 700 uses two 4-to-2 Carry-Save Adders (710 and 712) for n-bit input data in the first level, where each 4-to-2 Carry-Save Adders accepts four inputs with n bits and produces two outputs in (n+2) bits. The four outputs from the two 4-to-2 Carry-Save Adders are provided to a second level 4-to-2 Carry-Save Adder 714 for (n+2)-bit input data to produce two final outputs in (n+4) bits. For a 16-to-2 Carry-Save Adder tree, the fast adder tree can be formed using 3-level 4-to-2 Carry-Save Adders, where the number of 4-to-2 Carry-Save Adders in levels 1, 2 and 4 correspond to 4, 2 and 1 respectively. Again, for n-bit inputs, the outputs from the 16-to-2 Carry-Save Adder are in (n+6) bits.

Figure 8:
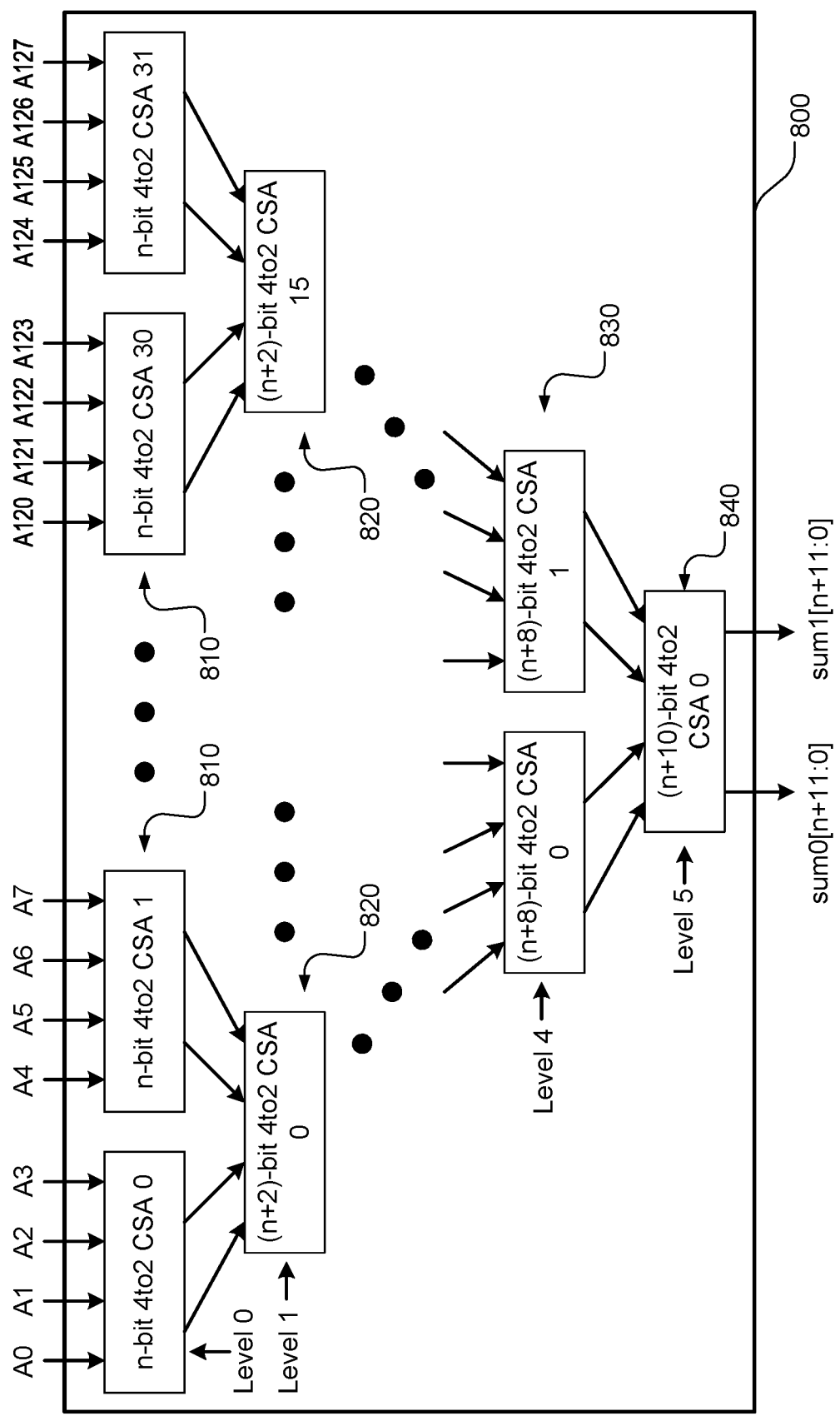
FIG. 8 illustrates an example of fast 128-to-2 Carry-Save Adder tree based on the fast 4-to-2 Carry-Save Adder.

The number of levels of 4-to-2 Carry-Save Adders required to support N (N=$2^m$) inputs is m/2. Accordingly, for 4, 8, 16, . . . , 128, 256 and 512 inputs, the numbers of levels required are 1, 2, 3, . . . , 6, 7 and 8 respectively. For each additional level, the bit depth for the outputs of the 4-to-2 Carry-Save Adder is increased by 2 bits. Therefore, if the input bit depth is n bits, the output bit depth for the 128-to-2 Carry-Save Adder is (n+12) bits and the output bit depth for the 256-to-2 Carry-Save Adder is in (n+14) bits. FIG. 8 illustrates an example of fast 128-to-2 Carry-Save Adder tree 800 based on the fast 4-to-2 Carry-Save Adder. The fast 128-to-2 Carry-Save Adder 800 uses 32 n-bit 4-to-2 Carry-Save Adders (810) in the first level, where each 4-to-2 Carry-Save Adders accepts four inputs and produces two outputs. The outputs from the first level 4-to-2 Carry-Save Adders are provided to a second-level 4-to-2 Carry-Save Adders 820 to produce second level outputs. A total of 16 second-level 4-to-2 Carry-Save Adders are needed and each adder is for (n+2)-bit input data. There are a total of 6 levels of 4-to-2 Carry-Save Adders for the 128-to-2 adder. Two 4-to-2 Carry-Save Adders 830 are used in the second last level; each adder is for (n+8) bit input data. There is only one 4-to-2 Carry-Save Adder 840 and the adder is for (n+10) bit input data. The bit depth of the two outputs from the 128-to-2 adder is (n+12) bits.

As mentioned above, the data range may be increased by 2 bits. Therefore, the bit depths of the adder tree have to be carefully designed to avoid data overflow. On the other hand, the bit depth should not be over designed to avoid unnecessary cost increase. In FIG. 8, the bit depth of the 4-to-2 Carry-Save Adder is increased by 2 bits for each additional level. However, the inputs to the 128-to-2 Carry-Save Adder correspond to the multiplication results of weighted input signals. The multiplication results may not extend to a full data range. The final results may not need to extend the bit depth by 2m bits for an −level adder tree. Accordingly, the bit depth for some intermediate levels of the adder tree may be reduced in order to save some cost. For example, the extra bit depth for the last level of the example in FIG. 8 may be reduced from 12 to 7 bits based on test data for a neural network system.

In the example shown in FIG. 8, the processing time from the inputs (i.e., A0, A1, . . . , A127) to the outputs (i.e., sum0, sum1) can be within one clock cycle for a properly designed system. In case that the processing time of the fast float-point 128-to-2 Carry-Save Adder exceeds a clock cycle, the fast float-point 128-to-2 Carry-Save Adder tree can be split into two stages by utilizing registers to buffer the intermediate results. The first stage covers level 0 through level (k-1) so that the processing time from the inputs to the outputs of level (k-1) can fit into one clock cycle. For example, if the processing time for the fast float-point 128-to-2 Carry-Save Adder in FIG. 8 exceeds a clock cycle, but the processing time from level 0 through level 4 can fit into one clock cycle, then registers can be used to buffer the results from level 4. In this example, the registers only need to buffer 4 output data.

In order to adapt to different power and precision requirements, a configurable system is created to support two different precision modes:

Low precision mode: it keeps 40 bits of fraction for the data at the input of the signed fast fixed point adder tree at each level.

High precision mode: it keeps 81 bits of fraction for the data at the input of the signed fast fixed point adder tree input at each level. Through some computer simulations, it is determined that the 81 bits of fraction are sufficient to retain all the significand of product fraction.

Compared to the traditional floating point adder, which will lose accuracy after every 2-to-1 adder, the high precision mode according to the present invention is much more precise.

In most applications, it may not need such high precise to keep all the 81 bits. Accordingly, the low precision mode is defined which can save almost half of the power for performing the addition. The setting between the low precision and the high precision can be selected depending on the applications.

The 2-to-1 fp32 adder results in outputs in the fp32 format, which includes 1 sign bit, 1 integer bit and 23 mantissa bits (i.e., a total of 25 bits). In the fast adder tree low-precision mode, 40 bits of significand are retained during addition. Therefore, there are 15 bits more than the 2-to-1 fp32 adder. If the input pattern is statistically random, the low precision mode will provide sufficient precision in most cases because more bits than the input data are retained. However, if the input is in some special pattern that big positive values and big negative values are almost equal and result in a much smaller addition result, it's possible that 2-to-1 fp32 adder may be more precise.

In conclusion, the low precision mode achieves satisfactory performance and consumes much smaller power in most cases. Accordingly, the low precision mode makes sense in applications that have no special precision requirement.

The above description is presented to enable a person of ordinary skill in the art to practice the present invention as provided in the context of a particular application and its requirement. The invention may be embodied in other specific forms without departing from its spirit or essential characteristics. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Various implementations of the systems and techniques described here can be realized in digital electronic circuitry, integrated circuitry, specially designed ASICs (application specific integrated circuits), field programmable gate array (FPGA), and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention claimed is:

1. A 4-to-2 fixed-point Carry-Save Adder (CSA) to generate a sum output and a carry-over output for four input operands, wherein each input operand is represented as a signed n-bit data, the sum output and the carry-over output are (n+2)-bit data, and n is a positive integer, the 4-to-2 fixed-point Carry-Save Adder comprising:
a first 3-to-2 adder array comprising (n+1) 1-bit 3-to-2 adders configured to receive and apply bit-wise addition to three first adder-array inputs to generates a first adder-array sum output and a first adder-array carry-over output;
a second 3-to-2 adder array coupled to the first 3-to-2 adder array, wherein the second 3-to-2 adder array comprises (n+2) 1-bit 3-to-2 adders configured to receive and apply the bit-wise addition to three second adder-array inputs to generates a second adder-array sum output and a second adder-array carry-over output;
wherein the three first adder-array inputs are coupled to three of the four input operands and the three second adder-array inputs are coupled to the first adder-array sum output, the first adder-array carry-over output, and a remaining one of the four input operands; and
wherein the second adder-array sum output and the second adder-array carry-over output are coupled to the sum output and the carry-over output.

2. The 4-to-2 fixed-point Carry-Save Adder of claim 1, comprising a first input formatter configured to extend sign bits of said three of the four input operands to generate three sign-extended input operands respectively and to provide the three sign-extended input operands as the three first adder-array inputs to the first 3-to-2 adder array.

3. The 4-to-2 fixed-point Carry-Save Adder of claim 1, comprising a second input formatter configured to extend the sign bit of the first adder-array sum output to generate a sign-extended first adder-array sum output, to left-shift by 1-bit and then to extend the sign bit of the first adder-array carry-over output to generate a sign-extended first adder-array carry-over output, to extend the sign bit of the remaining one of the four input operands twice to generate a sign-extended remaining input operand, and to provide the sign-extended first adder-array sum output, the sign-extended first adder-array carry-over output and the sign-extended remaining input operand as the three second adder-array inputs to the second 3-to-2 adder array.

4. The 4-to-2 fixed-point Carry-Save Adder of claim 1, comprising an output formatter configured to provide the second adder-array sum output as the sum output, and to left-shift by 1-bit the second adder-array carry-over output to generate a shifted adder-array carry-over output and to provide the shifted adder-array carry-over output as the carry-over output.

* * * * *